No. 829,015. PATENTED AUG. 21, 1906.
W. A. JOHNSON.
ELECTRIC MACHINE.
APPLICATION FILED JAN. 13, 1905.

4 SHEETS—SHEET 1.

Witnesses
Edgar Sheppard
J. Y. Tsuboi

Inventor
W. A. Johnson
by
Fred B. ...
Atty

No. 829,015. PATENTED AUG. 21, 1906.
W. A. JOHNSON.
ELECTRIC MACHINE.
APPLICATION FILED JAN. 13, 1905.

4 SHEETS—SHEET 2.

Witnesses

Inventor
W. A. Johnson.

No. 829,015. PATENTED AUG. 21, 1906.
W. A. JOHNSON.
ELECTRIC MACHINE.
APPLICATION FILED JAN. 13, 1905.

4 SHEETS—SHEET 3.

Witnesses

Inventor
W. A. Johnson
by
Atty.

No. 829,015. PATENTED AUG. 21, 1906.
W. A. JOHNSON.
ELECTRIC MACHINE.
APPLICATION FILED JAN. 13, 1905.
4 SHEETS—SHEET 4.
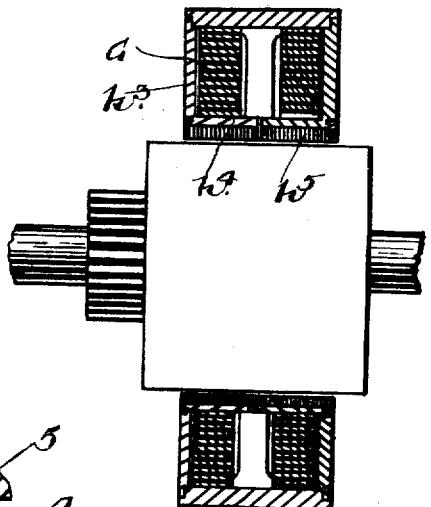
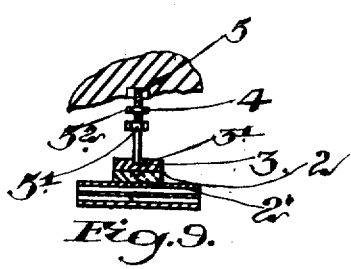
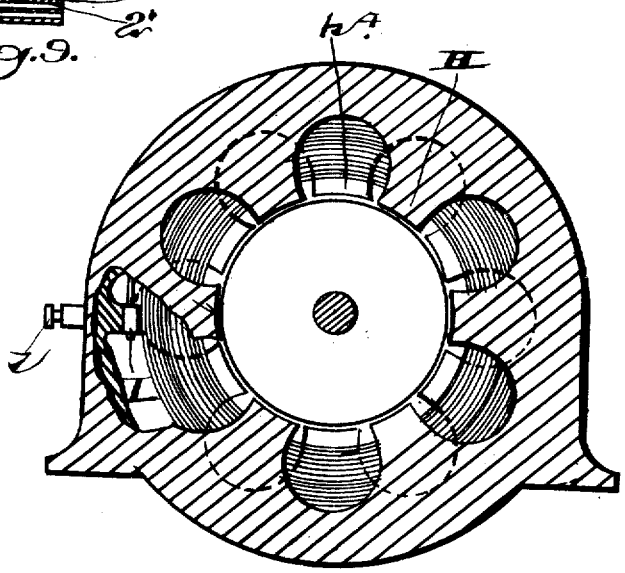
Witnesses.
Inventor.
W. A. Johnson

UNITED STATES PATENT OFFICE.

WILLIAM ASAHEL JOHNSON, OF TORONTO, CANADA.

ELECTRIC MACHINE.

No. 829,015.  Specification of Letters Patent.  Patented Aug. 21, 1906.

Application filed January 13, 1905. Serial No. 240,948.

*To all whom it may concern:*

Be it known that I, WILLIAM ASAHEL JOHNSON, electrician, residing at the city of Toronto, in the county of York, in the Province of Ontario, Canada, have invented certain new and useful Improvements in Electric Machines, of which the following is the specification.

My invention relates to improvements in electric machines; and the object of the invention is to provide an economic, simple, efficient, and cool-running machine of this class in which the regulation will be close and which will withstand short-circuiting at terminals without detrimental effect to the machine.

To carry out this object, I have constructed and arranged this invention as hereinafter more particularly explained and set forth in detail.

Figure 1:
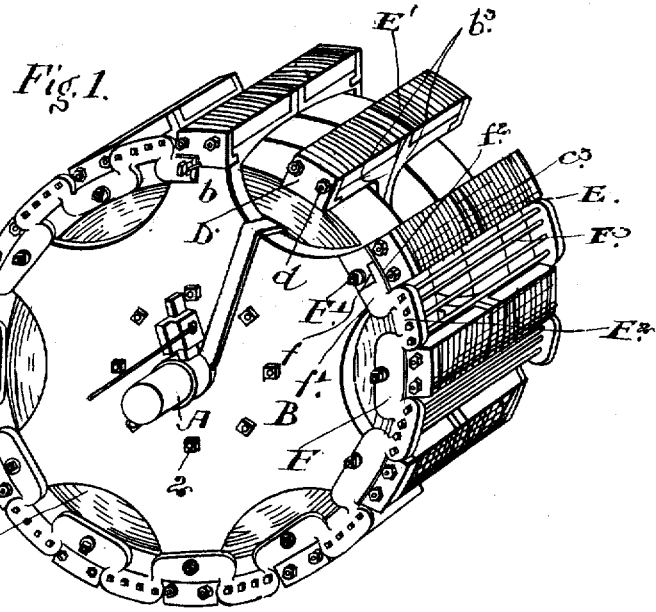
Figure 3:
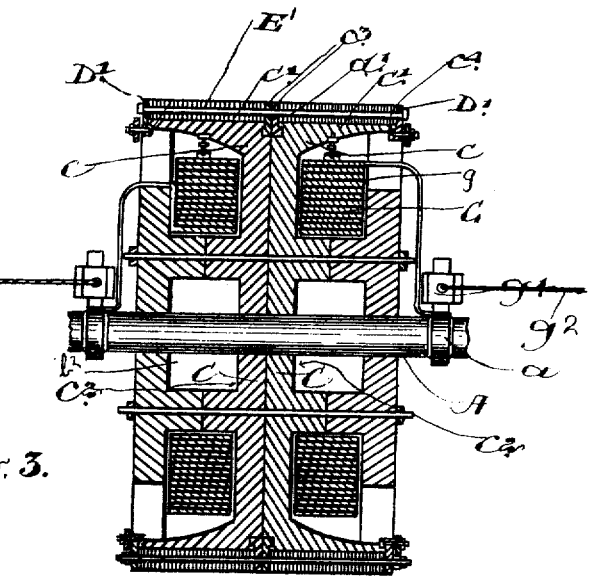
Figure 2:
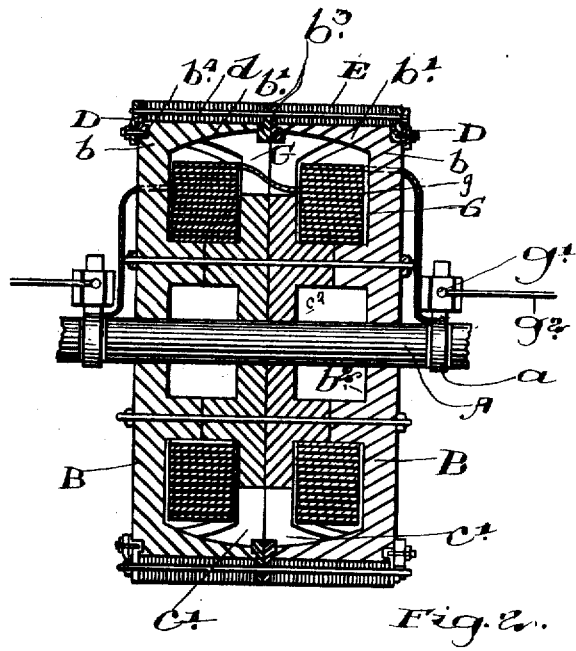
Figure 4:
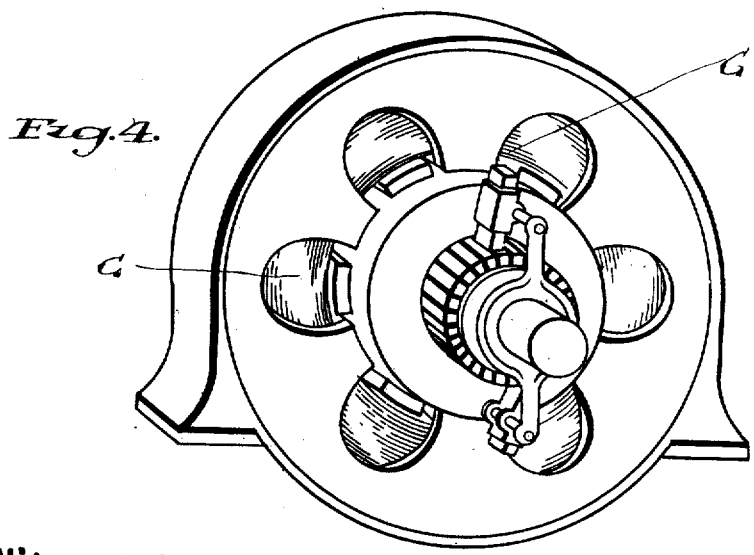
Figure 5:
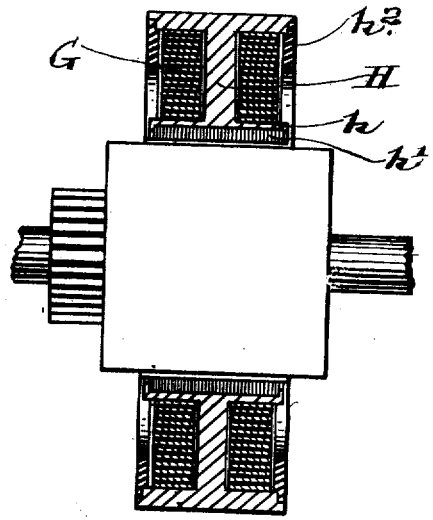
Figure 7:
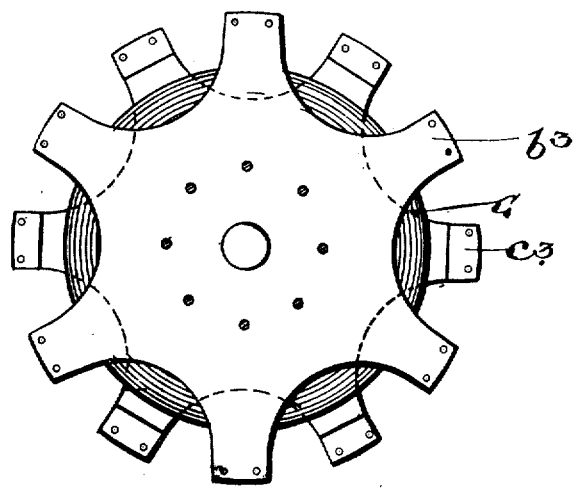

Figure 1 is a perspective view of a revolving field of an alternator or armature of a dynamo. Fig. 2 is a vertical section through the field on a plane cut through the center of the outside poles on a line with the axis of the shaft. Fig. 3 is a vertical section through the field on a plane cut through the center of the inside poles on a line with the axis of the shaft. Fig. 4 is a perspective view of a direct-current machine, showing the form of poles and winding of the stationary field. Fig. 5 is a vertical section through the central poles of the field on a line with the axis of the shaft, Fig. 4. Fig. 6 is a vertical section through the outside poles of the field on a line with the axis of the shaft, Fig. 4. Fig. 7 is a face view showing the arrangement of poles and winding shown in Fig. 1. Fig. 8 is a vertical cross-section of Fig. 4. Fig. 9 is a detail of the clamp for winding.

In the drawings like characters of reference indicate corresponding parts in each figure.

In Figs. 1, 2, 3, and 7, A is the main shaft of the rotor. B B are two castings identical in form and provided with pole ends $b$ $b$, having the laterally-extending portions $b'$ $b'$. Each casting B has one flat face and an annulus $b^2$ on the opposite side.

C C are two castings identically formed to the castings B B and provided with pole ends $c$ $c$, having the laterally-extending portions $c'$ $c'$. Each casting C has one flat face and an annulus $c^2$ at the opposite side. The castings B B are placed together, so that the ends of the laterally-extending portions $b'$ $b'$ abut each other. At the abutting ends are formed on the casting flanges $b^3$ $b^3$, (see Fig. 2,) for a purpose which will hereinafter appear. These flanges may be formed on the ends by placing pieces of the same form in the mold and connected to the patterns by pins in any suitable manner.

The plates B B and C C are secured together by the bolts 2, passing through the plates parallel with the shaft.

D D are end pieces for the poles, which are L-shaped in cross-section, the base of the L fitting in recesses $b^4$, as indicated. E represents the laminæ of the poles formed by the castings B B, such laminæ being held in position by the cross-bolt $d$, extending through the same and the center flanges $b^3$ and end pieces D D.

I wish it to be understood in this specification that the castings B and C are formed identical, the castings B being placed with their laterally inwardly extending pole ends abutting and the annulus $b^2$ abutting the annulus $c^2$ of the castings C, as shown in Figs. 2 and 3. In the latter figure the poles $c$ are formed with the laterally-extending portion $c'$, extending outwardly, and are provided with L-shaped flanges D′ D′, having the base thereof fitting into recesses $c^4$ at the ends of the laterally-extending portions. The flanges $c^3$ are formed at the center, where the castings abut similar to the way the flanges $b^3$ are formed, and the laminæ E′ are connected together by a central bolt $d'$, extending through the ends D′, the laminæ, and the central flanges $c^3$.

It will thus be seen that both the centrally-supported poles and the side-supported poles, constituting my field, are formed from castings made from one pattern, making it an extremely cheap rotor, field, or armature to build.

In my construction of rotor I also provide end plates F, made in sections so as to extend around the casting B near its periphery, such end plates having jogs $f$ $f'$ in them, so that they overlap and are fastened to the pole ends by suitable bolts F′. The end plates are insulated from the pole ends preferably by strips of insulating material $f^2$.

It will be noticed that the sections F F are formed with outwardly-extending U-shaped portions F², such portions being located between the poles $b$ and $c$, and through the plates F² extend the rods F³, thus forming a squirrel-cage winding, for a purpose which will hereinafter appear.

In the annular spaces formed outside the annuli $b^2$ and $c^2$ I provide on each side of the central portion C of the field a winding formed, preferably, of a continuous thin flat strip of copper G G, wound flatwise upon itself, necessarily in the form of a helix, and separated and insulated as to each convolution throughout its many turns by strips $g$ of insulating material.

The ends of the copper strips G are connected to the holders $g'$, carrying the brushes $g^2$, located on the insulated rings $a$ on the main shaft at each end of the field.

In Figs. 4, 5, 6, and 8 the field is a stationary field annular in form, divided centrally by the poles H, having the pole ends $h$ provided, preferably, with laminæ $h'$, as indicated. Retaining-rings $h^2$ are provided, which form divided poles $h^3$ at each side, the inner ends $h^4$ of which extend inwardly and form a support for the laminæ $h^5$ of the pole ends. (See Fig. 6.) The winding on each side of the central portion consists of a continuous thin flat strip of copper wound flatwise upon itself, necessarily in the form of a helix, and separated by a strip of thin insulating material, the outer end of the strip extending into a holder I, where it is fastened by set-screws $i$.

In the usual type of coil which consists of many turns of round wire side by side and many layers in depth, each composed of many turns, the current would flow through each turn of the wire and have a detrimental and inductive effect upon the neighboring coils, and therefore the winding does not fully achieve its object—that is to say, economically magnetize the core.

In my invention a heavier current can be sent through the copper strip proportionately than can be sent through the ordinary winding, thus obtaining a stronger magnet with a less ohmic resistance of the metal, and the flow of current is a flat film extending from end to end of the coil without cross-induction or detractive reactive influences.

In my form of winding also the use of a flat broad copper strip wound on at the same time with insulating material results, I find in practice, in the temperature of the coil being far less proportionately than in ordinary winding.

My improved type of winding may be applied to various machines constructed in accordance with my principle or to other makes where one or more energizing-coils are used in a position concentric to the shaft. This form of winding may be also applied to the more common multipolar type of winding—that is, to machines having two or more radial magnetic projections on which the coils are placed.

I am aware that flat copper windings have been used for the compound coils of direct-current machines at one end of the radially-arranged poles, and also in other cases the winding has been on edge, which necessitated the employment of expensive machinery to prevent crimping, which I avoid; but in no case has it, as far as I am aware, been used on concentric drum-like coils.

In my machine as described above and where used in a generator or motor I provide, as hereinbefore described, the squirrel-cage short-circuited winding. I do not claim, broadly, the principle of this winding, but its use in conjunction with my type of magnet-field, as my style of field is practically adapted for the placing of the short-circuited winding shown, and the advantage of this novel construction is that when used as a generator this short-circuited winding has the effect of keeping two or more generators in phase with each other. For instance, if two generators are driven by separate engines and one engine should vary in speed the effect of this winding would be to still keep the generators, as stated, in phase with each other. Again, when used as a synchronous motor it will start as an induction-motor. The heavy short-circuited bar-winding located as shown with my improved type of revolving field allows of the throwing of the motor onto the line by means of a suitable switch, and the motor may be operated as a synchronous motor. Once this motor obtains a speed sufficient to place it in synchronism with a supply-generator, or at any moment after it has reached the necessary speed, the switch may be closed instantly. After the synchronizing-lamps have died to a minimum color or candle-power it is not necessary to wait until the lamps are at brightness or at darkness, as is usual with all other types; but once lamps have attained darkness or any point between darkness and brightness the switch may be closed. In all types of machines it is necessary to close the machines instantly at the darkening of the filament or at the brightening of the filament of the lamp and not in between—that is, the time of closing the switch is limited—which is not so in my case.

It will be noticed also in my machine that the base of the coil or the drum upon which it is wound is concentric to the shaft and is formed by the abutting annuli, and this is the case in both the stationary and revolving fields or armatures.

In order to hold the last convolution of the coil from slipping and to prevent strain on the terminal connection, I preferably use, in addition to the usual banding, insulating-plates 2, concaved to fit the coil and superimposed upon them the metal plates 3, which have tongues $3'$, which fit into grooves $2'$ in the insulating-plates 2, and these plates I hold in position by means of a compression-bolt 4, the outer threaded end of which fits into a recess 5 in the pole end. This bolt is sustained by means of the nut-shaped end 5' until the pressure is reached, when the jam-nut 5² is screwed home against the pole end, and thereby the plate is securely held.

What I claim as my invention is—

1. In an electric machine, a magnetic field or armature comprising four identical plates adjacently placed on planes perpendicular to the axis of rotation and parallel to the face of the field, the two outer plates being formed with arc-shaped recesses between which extend the pole-pieces having inwardly-extending and abutting outer ends, the plates being also arranged with the inwardly-extending annuli peripherally within the pole-pieces and two inner plates having their plain faces abutting each other on the central line of the field perpendicular to the axis of rotation and parallel to the face of the field and formed with arc-shaped recesses in the periphery and pole-pieces between them from the outer ends of which extend the outwardly-extending projections, the latter plates being also provided with outwardly-extending annuli, which abut the inwardly-extending annuli of the outer plates and the pole-pieces of the inner plates being alternately arranged in relation to the pole-pieces of the outer plates as and for the purpose specified.

2. In an electric machine, the combination with the inner plates and outer face-plates provided with peripheral arc-shaped recesses forming the end and central pole-pieces respectively and abutting annuli within the poles and between the plates, of two exciting-coils extending around the drum and formed of thin flat strips, each wound flatwise upon itself around the annuli and in the form of a helix and separated and insulated throughout the convolutions by strips of insulating material as and for the purpose specified.

3. In an electric machine, the combination with the inner plates and outer face-plates provided with peripheral arc-shaped recesses forming the end and central pole-pieces respectively and abutting annuli within the poles and between the plates, of a squirrel-cage winding comprising plates suitably fastened to the pole ends of the field and insulated from them and bridging the space between the poles, and rods extending from end plate to end plate between the poles as and for the purpose specified.

4. In combination the central inner plates having their plain faces abutting and having outwardly-extending annuli formed on the same and provided with arc-shaped recesses in the periphery, whereby pole ends are formed, said pole ends having outwardly-extending projecting portions and the outer face-plates provided with inwardly-extending annuli abutting the annuli of the central plates and arc-shaped recesses forming pole ends, said pole ends being provided with inwardly-extending projecting portions as and for the purpose specified.

5. In combination the central inner plates having their plain faces abutting and having outwardly-extending annuli formed on the same and provided with arc-shaped recesses in the periphery, whereby pole ends are formed, said pole ends having outwardly-extending projecting portions and the outer face-plates provided with inwardly-extending annuli abutting the annuli of the central plates and arc-shaped recesses forming pole ends, said pole ends being provided with inwardly-extending projecting portions, projections formed on the pole ends aforesaid, whereby they abut, central end pieces fitting in grooves at the opposite end of the pole ends, the laminæ extending between the projections and the end pieces, and the bolts extending through the laminæ, projections and end pieces as and for the purpose specified.

6. The combination with the coil and plates having the laterally-extending pole ends, of means between the pole ends and the coil for exerting a pressure on the outer convolution of the coil for holding it from slipping as and for the purpose specified.

7. The combination with the coil and plates having the laterally-extending pole ends, of an insulating-plate fitting the contour of the last convolution, the metal plate fitted in such insulating-plate and a compression-screw extending into the pole end and abutting the metal plate as and for the purpose specified.

WILLIAM ASAHEL JOHNSON.

Witnesses:
B. BOYD,
C. B. SHEFFIELD.